United States Patent
Maslen et al.

(10) Patent No.: US 11,924,175 B2
(45) Date of Patent: *Mar. 5, 2024

(54) SYSTEMS AND METHODS FOR WEB TRACKER CLASSIFICATION AND MITIGATION

(71) Applicant: Microsoft Technology Licensing, LLC, Redmond, WA (US)

(72) Inventors: Brandon J. Maslen, Redmond, WA (US); Edward Arther Scott Low, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/049,787

(22) Filed: Oct. 26, 2022

(65) Prior Publication Data

US 2023/0062793 A1 Mar. 2, 2023

Related U.S. Application Data

(63) Continuation of application No. 17/000,111, filed on Aug. 21, 2020, now Pat. No. 11,522,837.

(Continued)

(51) Int. Cl.
*G06F 21/62* (2013.01)
*G06F 16/951* (2019.01)
*G06F 16/9535* (2019.01)
*G06N 5/04* (2023.01)
*G06N 20/00* (2019.01)

(Continued)

(52) U.S. Cl.
CPC ........ *H04L 63/0428* (2013.01); *G06F 16/951* (2019.01); *G06F 16/9535* (2019.01); *G06F 21/6263* (2013.01); *G06N 5/04* (2013.01); *G06N 20/00* (2019.01); *H04L 67/02* (2013.01)

(58) Field of Classification Search
CPC .. G06F 16/951; G06F 16/9535; G06F 16/955; G06F 21/6263; G06F 21/316; G06F 21/6254; G06F 11/3438; G06F 18/24; G06F 3/048; G06N 5/04; G06N 20/00;

(Continued)

(56) References Cited

U.S. PATENT DOCUMENTS 11,057,427 B2 * 7/2021 Wright ............... H04L 63/1425
2013/0132833 A1 * 5/2013 White ..................... G06F 3/048
715/704

(Continued)

*Primary Examiner* — Le H Luu

(57) ABSTRACT

Embodiments described herein are directed to intelligently classifying Web trackers in a privacy preserving manner and mitigating the effects of such Web trackers. As users browse the Web and encounter various Web sites, tracker-related metrics are determined. The metrics are obfuscated to protect the privacy of the user. The obfuscated metrics are provided as inputs to a machine learning model, which is configured to output a classification for the Web trackers associated with the Web sites visited by the user. Depending on the classification, the effects of the Web trackers are mitigated by placing restrictions on the Web trackers. The restrictions for a particular Web tracker may be relaxed based on a level of user engagement a user has with respect to the tracker's associated Web site. By doing so, the compatibility risks associated with tracking prevention are mitigated for Web sites that are relatively important to the user.

20 Claims, 8 Drawing Sheets

Related U.S. Application Data

(60) Provisional application No. 63/043,567, filed on Jun. 24, 2020.

(51) Int. Cl.
*H04L 9/40* (2022.01)
*H04L 67/02* (2022.01)

(58) Field of Classification Search
CPC . H04L 63/0428; H04L 63/1425; H04L 63/20; H04L 67/02; H04W 12/02
See application file for complete search history.

(56) References Cited

U.S. PATENT DOCUMENTS

| | | | |
|---|---|---|---|
| 2017/0142158 A1* | 5/2017 | Laoutaris | H04W 12/02 |
| 2017/0243028 A1* | 8/2017 | LaFever | G06F 21/6254 |
| 2017/0337397 A1* | 11/2017 | Tang | H04L 63/20 |
| 2018/0152471 A1* | 5/2018 | Jakobsson | H04L 63/1425 |
| 2018/0375877 A1* | 12/2018 | Jakobsson | G06F 16/955 |
| 2019/0080000 A1* | 3/2019 | Munoz | G06F 18/24 |
| 2019/0146616 A1* | 5/2019 | White | G06F 11/3438 715/704 |
| 2020/0097676 A1* | 3/2020 | Margel | G06F 21/316 |

\* cited by examiner

SYSTEMS AND METHODS FOR WEB TRACKER CLASSIFICATION AND MITIGATION

CROSS REFERENCE TO RELATED APPLICATION

This application is a continuation of U.S. patent application Ser. No. 17/000,111 filed Aug. 21, 2022, which claims priority to U.S. Provisional Application Ser. No. 63/043,567, filed Jul. 24, 2020, and entitled "Systems and Methods for Web Tracker Classification and Mitigation," the entirety of which is incorporated by reference herein.

BACKGROUND

Web trackers are pieces of code that are known to collect users' data while they browse, often recording it and using it to target users with personalized advertisements. Various browsers today support tracking prevention implementations that protect users from known trackers on the web. This is achieved by restricting the trackers' access to browser-based storage such as cookies, preventing them from storing the per-user identifiers that are used to track users across the web. While such protections help preserve user privacy, they can trigger an arms race with tracking entities. These trackers may try various methods to subvert tracking prevention systems by changing domain names or using localized delivery points in international markets to avoid detection. In addition, storage access restrictions may also cause compatibility issues with sites that expect such trackers to operate with unrestricted storage access SUMMARY This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Methods, systems, apparatuses, and computer-readable storage mediums are described for intelligently classifying Web trackers in a privacy preserving manner and mitigating the effects of such Web trackers. As users browse the Web and encounter various Web sites, tracker-related metrics are determined for such Web sites. The metrics are obfuscated to protect the privacy of the user. The metrics are obfuscated by scaling the metrics to the user's browsing history, using both dynamic and unknowable quantities. The obfuscated metrics are provided as inputs to a machine learning model, which is configured to output a classification for the Web trackers associated with the Web sites visited by the user. Depending on the classification, the effects of the Web trackers are mitigated. For instance, network and/or storage requests by a Web tracker may be restricted. The restrictions for a particular Web tracker may be relaxed based on a level of user engagement a user has with respect to the tracker's associated Web site. For example, if the level of user engagement is relatively high, then the restrictions placed on the Web tracker are relaxed. By doing so, the compatibility risks associated with tracking prevention are mitigated for Web sites that are relatively important to the user.

Further features and advantages of embodiments, as well as the structure and operation of various embodiments, are described in detail below with reference to the accompanying drawings. It is noted that the methods and systems are not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form a part of the specification, illustrate embodiments of the present application and, together with the description, further serve to explain the principles of the embodiments and to enable a person skilled in the pertinent art to make and use the embodiments.

Figure 1:
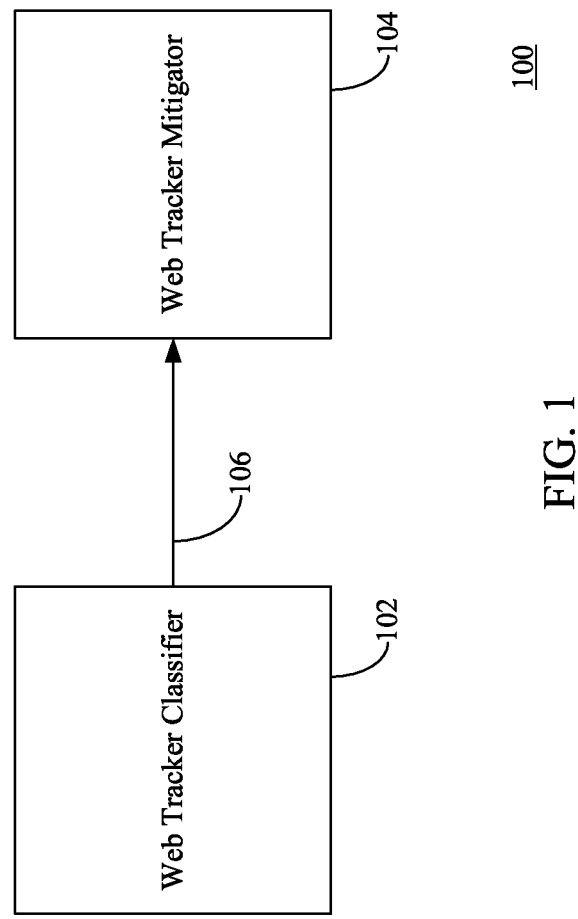
FIG. 1 shows a block diagram of a system for classifying Web trackers and mitigating the effects of classified Web trackers in accordance with an example embodiment.

The features and advantages of the embodiments described herein will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The following detailed description discloses numerous example embodiments. The scope of the present patent application is not limited to the disclosed embodiments, but also encompasses combinations of the disclosed embodiments, as well as modifications to the disclosed embodiments.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In the discussion, unless otherwise stated, adjectives such as "substantially" and "about" modifying a condition or relationship characteristic of a feature or features of an embodiment of the disclosure, are understood to mean that the condition or characteristic is defined to within tolerances that are acceptable for operation of the embodiment for an application for which it is intended.

Numerous exemplary embodiments are described as follows. It is noted that any section/subsection headings provided herein are not intended to be limiting. Embodiments are described throughout this document, and any type of embodiment may be included under any section/subsection. Furthermore, embodiments disclosed in any section/subsection may be combined with any other embodiments described in the same section/subsection and/or a different section/subsection in any manner.

II. Example Embodiments

Embodiments described herein are directed to intelligently classifying Web trackers in a privacy preserving manner and mitigating the effects of such Web trackers. As users browse the Web and encounter various Web sites, tracker-related metrics are determined for such Web sites. The metrics are obfuscated to protect the privacy of the user. The metrics are obfuscated by scaling the metrics to the user's browsing history, using both dynamic and unknowable quantities. The obfuscated metrics are provided as inputs to a machine learning model, which is configured to output a classification for the Web trackers associated with the Web sites visited by the user. Depending on the classification, the effects of the Web trackers are mitigated. For instance, network and/or storage requests by a Web tracker may be restricted. The restrictions for a particular Web tracker may be relaxed based on a level of user engagement a user has with respect to the tracker's associated Web site. For example, if the level of user engagement is relatively high, then the restrictions placed on the Web tracker are relaxed. By doing so, the compatibility risks associated with tracking prevention are mitigated for Web sites that are relatively important to the user.

In order to increase accuracy, privacy, and reduce computational load during usage, the machine learning model is trained using the same scalable metrics (or signals) collected by crawling a large sample of websites. These samples are scaled in the same manner, using the same unknowable quantities scaled up with the sample size. The training decision uses a sufficiently sized ground truth list of known trackers to inform the tracking patterns that should be classified.

The classification of trackers occurs in a scalable way that dynamically self-customizes to users as their browsing patterns and behaviors differ both between groups of users and over time. The classification also occurs in a privacy preserving manner to ensure that, in the presence of a side-channel attack to view classifications, the potentially sensitive, signals about the users' browsing patterns are protected and not disclosed.

The foregoing techniques advantageously scale to the vast variety of user browsing patterns, more accurately detect a wide variety of newer, unknown trackers, and preserve the user's privacy by preventing reverse engineering of personal or private information. Failing to protect the user's data risks leaking a user's browsing history to a malicious entity. To further enhance privacy, a small amount of random noise may be introduced to the obfuscated metrics when used for classification (but not training) to ensure unknowable quantities are not able to be reverse engineered.

In addition, in accordance with the mitigation techniques described herein, certain trackers may be selectively unblocked from sites that users frequently engage with. This ensures that sites users visit on a regular basis continue to work as expected, even in cases where they may be identified as trackers and made subject to storage restrictions.

For instance, FIG. 1 shows a block diagram of a system 100 for classifying Web trackers and mitigating the effects of classified Web trackers in accordance with an example embodiment. As shown in FIG. 1, system 100 includes a Web tracker classifier 102 and a Web tracker mitigator 104. Web tracker classifier 102 is configured to classify Web trackers executing on various Web sites accessed by a browser application utilized by a user. Web tracker classifier 102 is configured to classify Web trackers based on metrics associated with the Web trackers. Web tracker classifier 102 determines the metrics on a per-Web site basis and classifies Web trackers on a per-Web site basis. For instance, when a browser application accesses a particular Web site, Web tracker classifier 102 determines various metrics associated with a Web tracker executing thereon. The metrics include, but are not limited to, a type of one or more resources loaded for the Web site, a frequency at which the resource(s) are loaded for the Web site, one or more uniform resource locators (URLs) to which the browser application is redirected, a type and/or number of application programming interface (API) calls (e.g., network and/or storage requests) issued via the Web site, etc. Examples of resource(s) include, but are not limited to, scripts (e.g., JavaScripts), Cascading Style Sheets (CSS), images, etc.).

To protect the privacy of the user, Web tracker classifier 102 scales the metrics to the user's browsing profile or history using unknown descriptors of the browsing profile and/or patterns. The quantities used to scale the metrics change as the browsing pattern of the user changes. The scaled metrics are unknowable to entities (e.g., a Web site or Web tracker) other than the browser application. That is, the scaled metrics are not exposed by the User Agent of the browser application. Thus, such metrics are not queryable by the Web site and/or tracker executing thereon, or a malicious entity, such as a hacker. The scaling of the metrics obfuscates the metrics from such entities. To further enhance security, Web tracker classifier 102 may introduce a small amount of noise (e.g., random noise) to the scaled metrics. This advantageously ensures that the unknowable quantities are not able to be reverse engineered. Such metrics are provided to a machine learning model, which outputs a classification 106 of a particular Web tracker executing on a particular Web site. Classification 106 is provided to Web tracker mitigator 104. Additional details regarding Web tracker classifier 102 is described below in Subsection A.

Web tracker mitigator 104 is configured to mitigate the effects of the classified Web tracker. For instance, Web tracker mitigator 104 may restrict access by the classified Web tracker to storage maintained by a computing device on which the browser application executes. This prevents the Web tracker from accessing cookies stored on the computing device, from storing per-user identifiers that are utilized to track users across the Internet, etc. In other words, this prevents the Web tracker from tracking the user.

Web tracker mitigator 104 is also configured to selectively unblock (or relax) tracker activity based on certain criteria.

For example, web tracker mitigator 104 may unrestrict storage access by certain Web trackers if the Web trackers are associated with Web sites that users frequently engage with. For instance, Web tracker mitigator 104 may determine a user engagement score with respect to a particular Web site. If the user engagement score exceeds a predetermined threshold, then Web tracker mitigator 104 unrestricts storage access by the Web tracker. If the user engagement score does not exceed (or is below) the predetermined threshold, then the storage access by the Web tracker is continued to be restricted.

In accordance with an embodiment, Web tracker mitigator 104 may unrestrict storage access for Web trackers associated with a particular organization (e.g., a company, or domain). For instance, if a user engagement score for a particular Web site associated a particular organization exceeds a predetermined threshold, then that Web tracker is unrestricted across all Web sites associated with that particular organization. The foregoing advantageously ensures that storage restrictions that may cause compatibly issues are not applied to Web sites that users engage with often (and hence likely expect to work while browsing) and that users are protected from Web trackers that are associated with Web sites that they have never engaged with. Additional details regarding Web tracker mitigator 104 is described below in Subsection B.

A. Exemplary Web Tracker Classifier Embodiments

Figure 2:
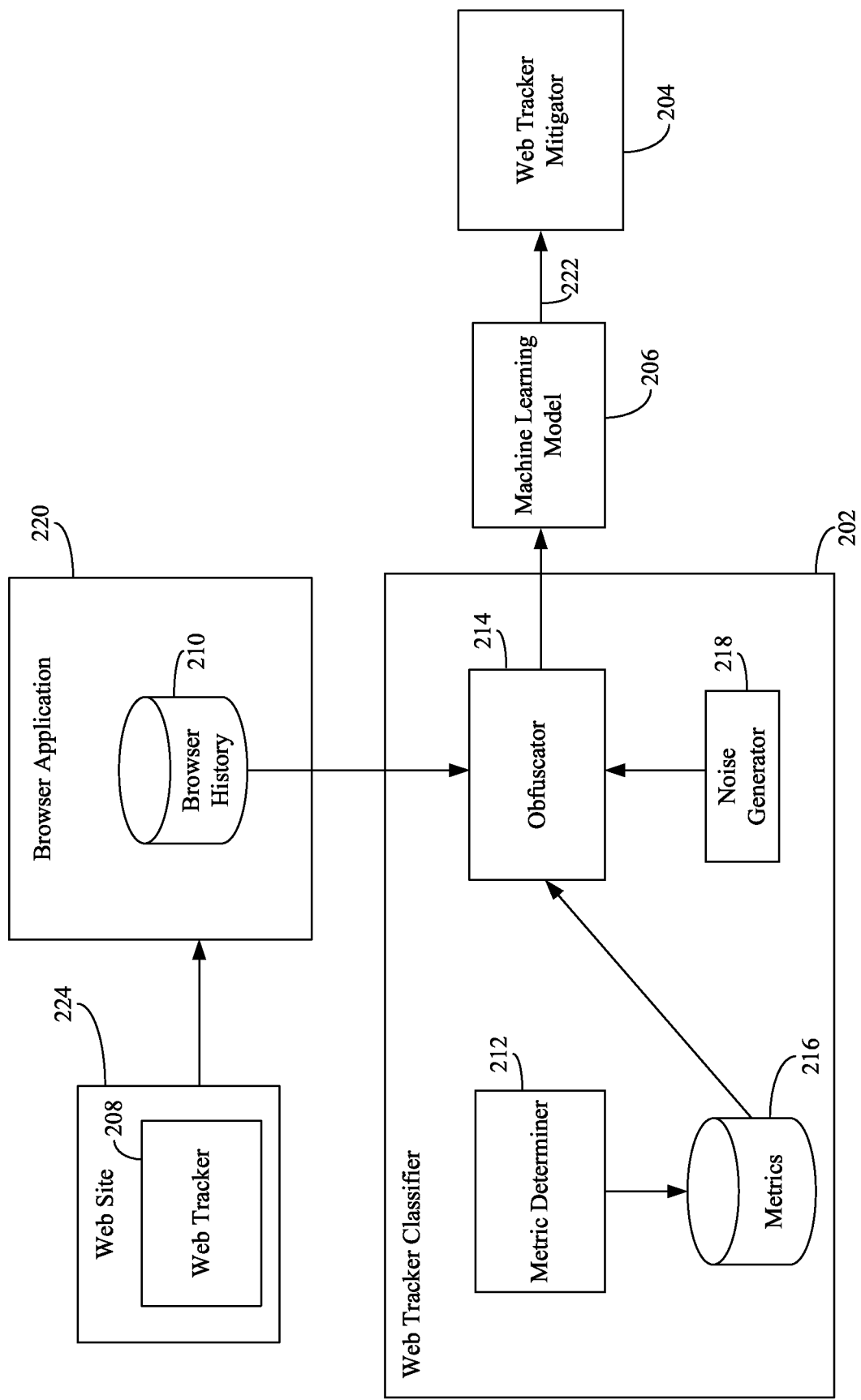
FIG. 2 shows a block diagram of a system for classifying Web trackers in accordance with an example embodiment.

FIG. 2 shows a block diagram of a system 200 for classifying Web trackers in accordance with an example embodiment. As shown in FIG. 2, system 200 comprises a Web tracker classifier 202, a browser application 220, a machine learning model 206, and a Web tracker mitigator 204. Web tracker classifier 202 is an example of Web tracker classifier 102, and Web tracker mitigator 204 is an example of Web tracker mitigator 104, as described above with reference to FIG. 1. As also shown in FIG. 2, browser application 220 has accessed a Web site 224 via which a Web tracker 208 executes. Web tracker 208 may be configured to track collect, store and/or share information about a particular user's activity (e.g., the user of browser application 220) on the Internet. Web tracker 208 may analyze the user's activity to provide content (e.g., targeted advertisements) that relate to determined preferences of the user. Web tracker 208 may perform the foregoing using various techniques. For instance, Web tracker 208 may store a cookie in the storage of the user's computing device. The cookie may be utilized to suggest content to the user, remember user credentials, etc. In another example, Web tracker 208 may load resources in Web site 224 that track the user's behavior and/or capture information pertaining to the user's computing device and/or applications executing thereon. Examples of such resources include, but are not limited to, pixel trackers or images embedded in Web site 224, scripts that execute as the user visits Web site 224, CSSs loaded for Web site 224, etc. Such resource(s) may utilize API requests to the user's computing device to obtain information pertaining to the user, e.g., via network and/or storage requests. Web site 224 may also utilize redirects that direct browser application 220 to one or more other Web sites, which read personalized referrer headers and URL parameters, thereby allowing such Web sites to observe parts of the user's browsing history and store such parts via cookies.

As further shown in FIG. 2, Web tracker classifier 202 comprises a metric determiner 212, an obfuscator 214, a noise generator 218 and a data storage 216. Metric determiner 212 is configured to determine metrics associated Web tracker 208. Such metrics include, but are not limited to, a type of resource(s) loaded for Web site 224, a frequency at which the resource(s) are loaded for Web site 224, URL(s) to which the browser application 220 is redirected, a type and/or number of API calls by Web tracker 208, etc. Metric determiner 212 stores the determined metrics in data storage 216. Data storage 216 may be any type of physical memory and/or storage device (or portion thereof) that is described herein, and/or as would be understood by a person of skill in the relevant art(s) having the benefit of this disclosure.

Obfuscator 214 is configured to retrieve the metrics from data storage 216 and obfuscate the metrics to protect the user's browser history (e.g., browser history 210) from Web site 224, Web tracker 208, or any other malicious entity. Obfuscator 214 obfuscates the metrics by scaling the metrics to the user's browser history 210. For instance, obfuscator 214 may scale metrics based on a total number of Web sites visited by the user within a predetermined duration of browser history 210, a total number or resource(s) loaded via a plurality of Web sites within a predetermined duration of browser history 210, a total number of Web sites to which browser application 220 was redirected within a predetermined duration of browser history 210, a total number of APIs issued by a plurality of Web sites visited by a user within a predetermined duration of browser history 210, etc. Examples of the predetermined duration includes, but are not limited to, the user's last two weeks of the user's browser history 210, last month of the user's browser history 210, the last six months of the user's browser history 210, the entirety of the user's browser history 210, etc. As an example, to obfuscate the metrics, obfuscator 210 may determine a ratio between a particular set of metrics (e.g., the number of resources loaded for Web site 224) and the total number of Web sites visited within the predetermined duration of browser history 210. In particular, obfuscator 210 may divide the number of resources loaded for Web site 224 and the total number of Web sites visited within the predetermined duration of browser 210 to generate the scaled metrics. It is noted that the obfuscation technique described above is purely exemplary and that the metrics may be scaled using other aspects of browser history 210, as described above. In accordance with an embodiment, the predetermined duration may be periodically changed to further enhance the privacy protection for the user.

Accordingly, the quantities of browser history 210 used to scale the metrics change as the browsing pattern of the user changes and is otherwise unknowable to entities other than browser application 220. For instance, such quantities are not exposed by browser application 220 (e.g., the User Agent of browser application 220), and thus, are not queryable by other entities, such as Web site 224, Web tracker 208, or a malicious entity.

Obfuscator 214 may further be configured to inject noise into the scaled metrics. For instance, noise generator 218 may generate noise, which is combined with the scaled metrics by obfuscator 214. In accordance with an embodiment, noise generator 218 comprises a random noise generator that is configured to randomly generate noise. However, it is noted that the embodiments described herein are not so limited and that other techniques for generating noise may be utilized.

The scaled (and optionally, noise-injected) metrics are provided to machine learning model 206 by obfuscator 214. Machine learning model 206 is configured to receive, as an input, the metrics and generate a classification 222 for Web tracker 208. To generate machine learning model 206, a plurality of Web sites across the Internet may be crawled. Metrics associated with each crawled Web site of the plurality of Web sites are scaled in a similar manner as described above with reference to obfuscator 214. For instance, metrics associated with a particular Web site are scaled based on the total number of Web sites crawled, a total number or resource(s) loaded via the crawled Web sites, a total number of Web sites to which browser application 220 was redirected via the crawled Web sites, a total number of APIs issued by the crawled Web sites, etc. For each Web site, a label corresponding to a known Web tracker associated with that Web site is provided to the machine learning algorithm. The label informs the machine learning algorithm of the tracking pattern associated with the Web tracker corresponding to the known Web tracker. Accordingly, the machine learning algorithm learns patterns associated with a plurality of Web trackers and generates a machine learning model (e.g., machine learning model 206) that is configured to classify Web trackers for Web sites visited by the user. Additional details regarding machine learning model 206 are described below with reference to FIGS. 4 and 5.

Classification 222 is provided to Web tracker mitigator 204. Web tracker mitigator 204 is configured to mitigate the effects of the classified Web tracker (i.e., Web tracker 208). For instance, Web tracker mitigator 204 may restrict access by the classified Web tracker to storage maintained by a computing device on which browser application 220 executes. This prevents Web tracker 208 from accessing cookies stored on the computing device, from storing per-user identifiers that are utilized to track users across the Internet, etc. In other words, this prevents Web tracker 208 from tracking the user. Additional details regarding Web tracker mitigator 204 is described below with reference to Subsection B.

Such techniques enable the intelligent and automatically classification of new Web tackers as they emerge on new domains. Thus, users may be protected from trackers previously never seen or detected by parties interested in detecting/blocking trackers. Despite users' browsing patterns varying, and potentially changing over time, equal protection can be provided to all users that does not bias any specific market segment or types of users. In order to be intelligent about these decisions, sensitive information (e.g., aspects regarding the user's browsing history) is utilized. Such techniques ensure that this information is protected, unknowable, and classification can be done in a secure and private manner.

Web tracker classifier 202 and Web tracker mitigator 204 may be incorporated as a feature of browser application 220 or may be subsequently incorporated as part of browser application 220 via a browser extension, a plug-in, etc. Machine learning model 206 may also be incorporated as part of browser application 220, Web tracker classifier 202 and/or Web tracker mitigator 204. Alternatively, machine learning model 206 may execute on a computing device remotely located from the computing device on which browser application 220, Web tracker classifier 202, and/or Web tracker mitigator 204 execute. For instance, machine learning model 206 may execute on a node (e.g., server) of a cloud service platform. An example of cloud service platform includes, but is not limited to, the Microsoft® Azure® cloud computing platform, owned by Microsoft Corporation of Redmond, Washington.

Figure 3:
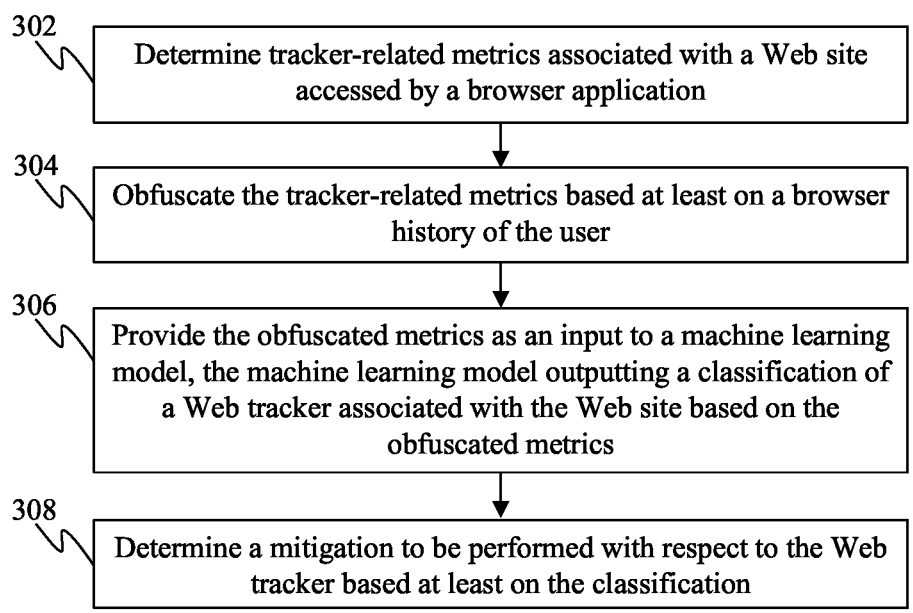
FIG. 3 shows a flowchart of a method for classifying and mitigating the effects of a Web tracker in accordance with example embodiment.

Accordingly, a Web tracker may be classified and mitigated in many ways. For example, FIG. 3 shows a flowchart 300 of a method for classifying and mitigating the effects of a Web tracker in accordance with example embodiment. In an embodiment, flowchart 300 may be implemented by system 200, as described in FIG. 2. Accordingly, flowchart 300 will be described with continued reference FIG. 2. Other structural and operational embodiments will be apparent to persons skilled in the relevant art(s) based on the following discussion regarding flowchart 300 and system 200.

Flowchart 300 of FIG. 3 begins with step 302. In step 302, tracker-related metrics associated with a Web site accessed by a browser application are determined. For example, with reference to FIG. 2, metric determiner 212 of Web tracker classifier 202 determines metrics related to Web tracker 208, which is associated with Web site 224 accessed by browser application 220.

In accordance with one or more embodiments, the tracker-related metrics comprise at least one of a type of one or more resources loaded for the Web site, a frequency at which the one or more resources are loaded for the Web site, or one or more uniform resource locaters to which the browser application is redirected. For example, with reference to FIG. 2, the tracker-related metrics stored in data storage 216 comprise at least one of a type of resource(s) loaded for Web site 224, a frequency at which resource(s) are loaded for Web site 224, URL(s) to which browser application 220 is redirected, etc.

At step 304, the tracker-related metrics are obfuscated based at least on a browser history of the user. For example, with reference to FIG. 2, obfuscator 214 obfuscates the tracker-related metrics based at least on browser history 210.

In accordance with one or more embodiment, the tracker-related metrics are obfuscated based on the browser history of the user and randomly-generated noise. For example, with reference to FIG. 2, obfuscator 214 obfuscates tracker-related metrics based on browser history 210 and randomly-generated noise generated by noise generator 218.

At step 306, the obfuscated metrics are provided as an input to a machine learning model. The machine learning model is configured to output a classification of a Web tracker associated with the Web site based on the obfuscated metrics. For example, with reference to FIG. 2, the obfuscated metrics are provided as an input to machine learning model 206. Machine learning model 206 is configured to output a classification 222 of Web tracker 208 associated with Web site 224.

At step 308, a mitigation to be performed with respect to the Web tracker is determined based at least on the classification. For example, with reference to FIG. 2, Web tracker mitigator 204 is configured to determine a mitigation to be performed with respect to Web tracker 208 based at least on classification 222.

In accordance with one or more embodiments, the mitigation comprises restricting access, by the Web tracker, to storage of a computing device on which the browser application executes. For example, with reference to FIG. 2, Web tracker mitigator 204 restricts access, by Web tracker 208, to storage of a computing device on which browser application 220 executes. Examples of storage include, but are not limited to. any type of physical memory and/or storage device (or portion thereof) that is described herein, and/or as would be understood by a person of skill in the relevant art(s) having the benefit of this disclosure.

Figure 4:
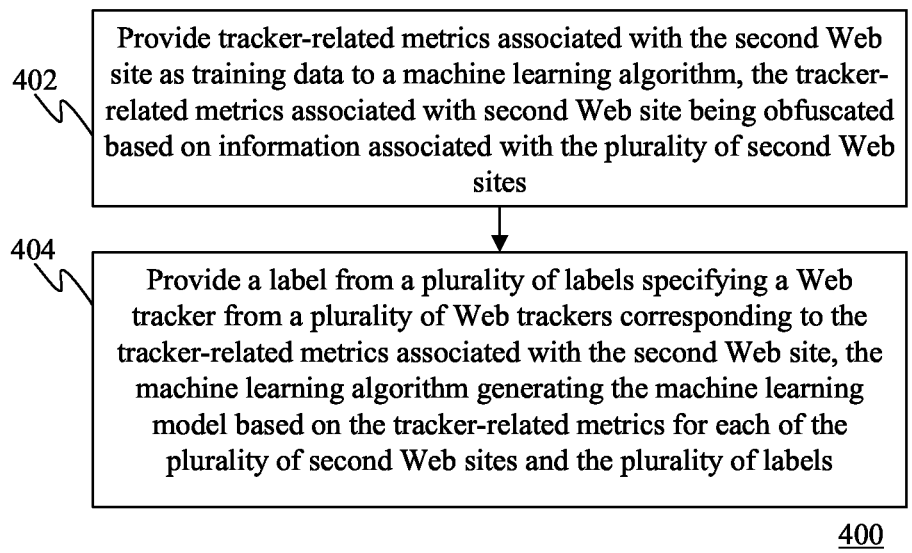
FIG. 4 shows a flowchart of a method for generating a machine learning model in accordance with example embodiment.
Figure 5:
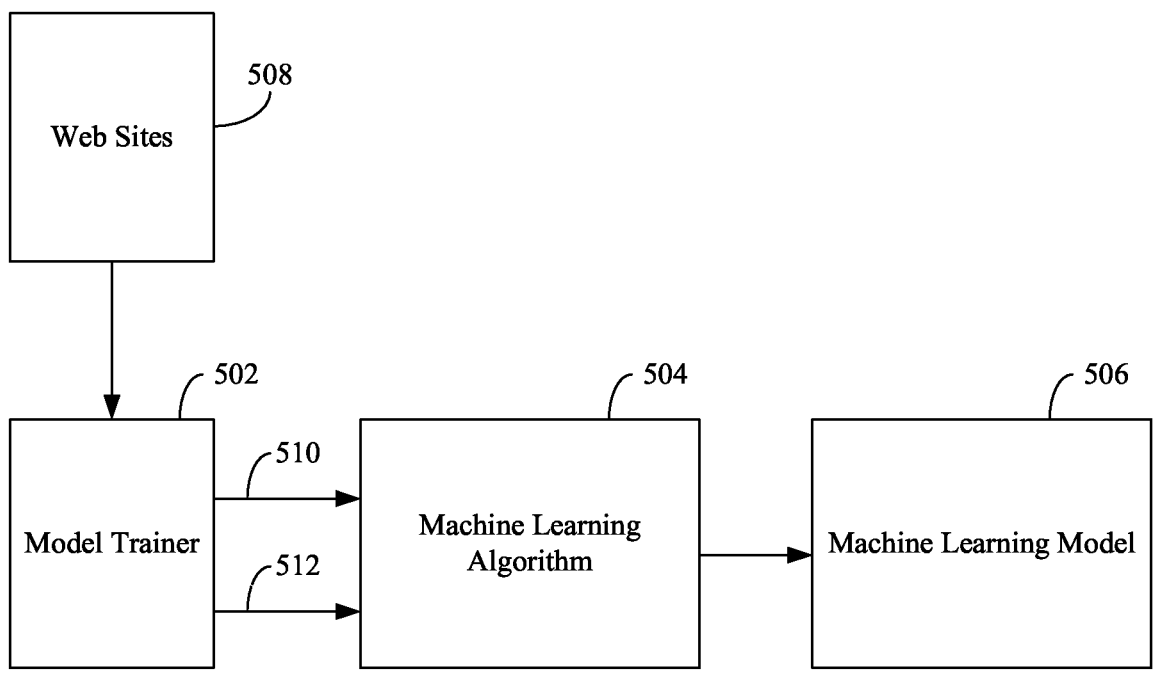
FIG. 5 shows a block diagram of a system for generating a machine learning model in accordance with an example embodiment.

FIG. 4 shows a flowchart 400 of a method for generating a machine learning model in accordance with example embodiment. In an embodiment, flowchart 400 may be implemented by system 500, as described in FIG. 5. FIG. 5 shows a block diagram of a system 500 for generating a machine learning model in accordance with an example embodiment. System 500 comprises a model trainer 502, a machine learning algorithm 504 and a machine learning model 506. Machine learning model 506 is an example of machine learning model 206, as described above with reference to FIG. 2. Flowchart 400 will be described with reference FIG. 5. Other structural and operational embodiments will be apparent to persons skilled in the relevant art(s) based on the following discussion regarding flowchart 400 and system 500.

Flowchart 400 of FIG. 4 begins with step 402. In step 402, for each second Web site of a plurality of second Web sites, tracker-related metrics associated with the second Web site is provided as training data to a machine learning algorithm. The tracker-related metrics associated with second Web site are obfuscated based on the plurality of second Web sites. For example, with reference to FIG. 5, model trainer 502 may crawl a plurality of Web sites 508 and obtain tracker-related metrics 510 for each Web tracker associated with Web sites 508. Model trainer 502 may obfuscate the determined tracker-related metrics based on the plurality of Web sites 508.

For example, metrics associated with a particular Web site may be obfuscated by scaling the metrics based on the total number of Web sites 508 crawled, a total number or resource(s) loaded via the crawled Web sites 508, a total number of Web sites to which browser application 220 was redirected via the crawled Web sites 508, a total number of APIs issued by the crawled Web sites 508, etc. Model trainer 502 provides the obfuscated metrics (e.g., metrics 510) to machine learning algorithm 504.

At step 404, a label from a plurality of labels specifying a Web tracker from a plurality of (known) Web trackers corresponding to the tracker-related metrics associated with the second Web site is provided to the machine learning algorithm. The machine learning algorithm generates the machine learning model based on the tracker-related metrics for each of the plurality of second Web sites and the plurality of labels. For example, with reference to FIG. 5, model trainer 502 provides a label 512 specifying the Web tracker corresponding to the tracker-related metrics (i.e., metrics 510). The label informs machine learning algorithm 504 of the tracking pattern associated with the label (i.e., label 512) corresponding to the known Web tracker. Accordingly, machine learning algorithm 504 learns patterns associated with a plurality of known Web trackers and generates machine learning model 506 that is configured to classify Web trackers (both new and old) for Web sites visited by the user.

B. Exemplary Web Tracker Mitigator Embodiments

While some trackers provide no value to the user (such as tracking "pixels" on a checkout page that track what a user puts in their shopping cart so that they can be targeted with ads later if they fail to check out), other trackers, for example, that enable single sign on services (e.g., "Sign in with Facebook", "Sign in with Gmail", etc.) provide end-user value/convenience in exchange for users' data.

Embodiments described herein selectively unblock certain trackers from Web sites that users frequently engage with. This ensures that Web sites they visit on a regular basis continue to work as expected, even in cases where they may be identified as trackers and made subject to storage restrictions. For example, a Web site implementing "Sign in with Facebook" capabilities is an example of a case where Facebook may be classified as a tracker and have its storage access restricted, thus breaking a user's ability to sign in. Such embodiments are described below with reference to FIGS. 6 and 7.

Figure 6:
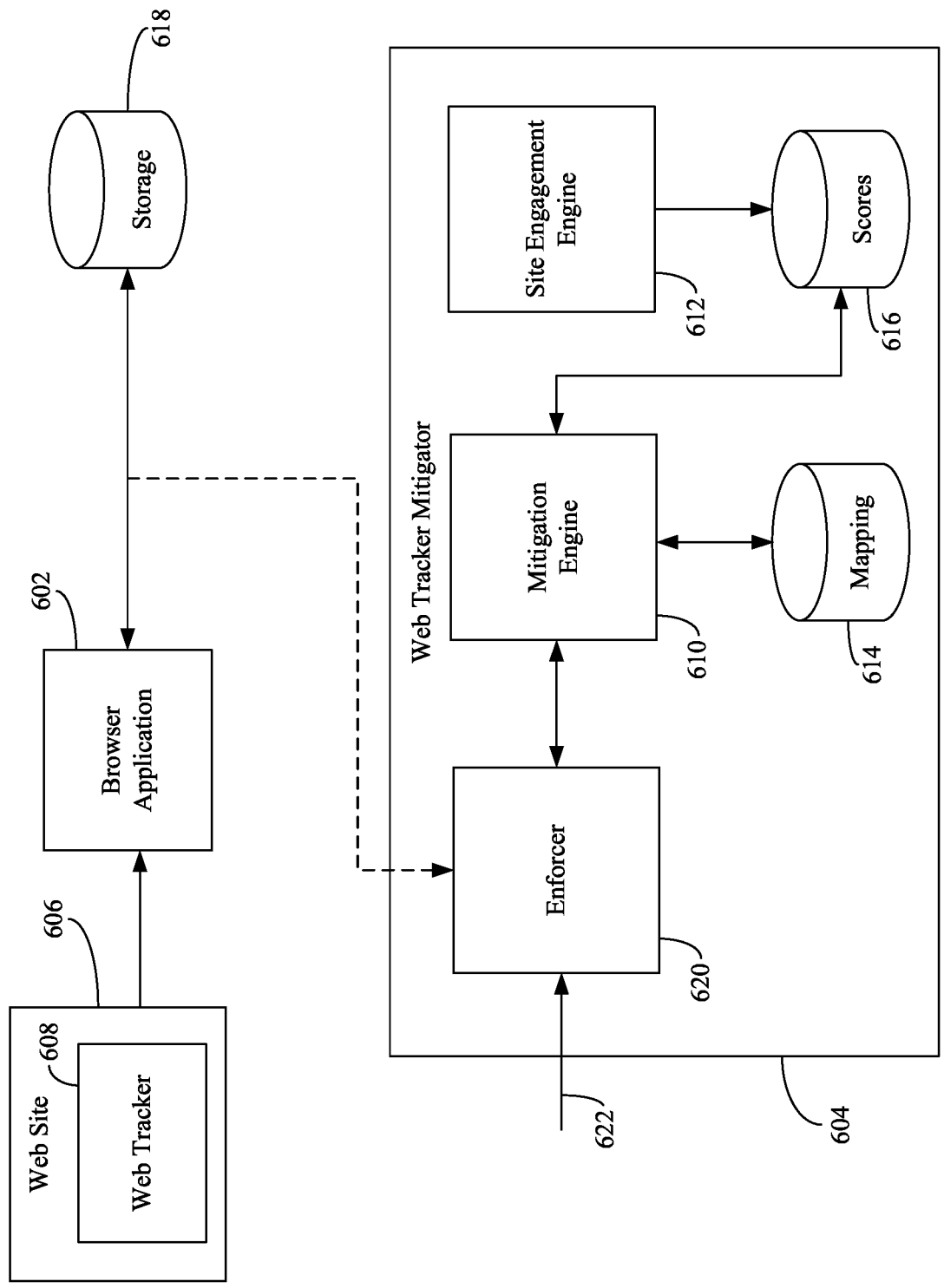
FIG. 6 shows a block diagram of a system for mitigating the effects of a Web tracker in accordance with an example embodiment.

FIG. 6 shows a block diagram of a system 600 for mitigating the effects of a Web tracker in accordance with an example embodiment. As shown in FIG. 6, system 600 comprises a browser application 602, a Web tracker mitigator 604, and a storage device 618. Web tracker mitigator 604 is an example of Web tracker mitigator 204, and browser application 602 is an example of browser application 220, as described above with reference to FIG. 2. As also shown in FIG. 6, browser application 602 has accessed a Web site 606 via which a Web tracker 608 executes. Web site 606 and Web tracker 608 are examples of Web site 224 and Web tracker 208, as respectively described above with reference to FIG. 2. Storage device 618 represents the storage maintained by the computing device on which browser application 602 executes. Storage device 618 may be any type of physical memory and/or storage device (or portion thereof) that is described herein, and/or as would be understood by a person of skill in the relevant art(s) having the benefit of this disclosure. As further shown in FIG. 6, Web tracker mitigator 604 comprises an enforcer 620, a mitigation engine 610, a site engagement engine 612, a first data storage 614, and a second data storage 616. Each of first data storage 614 and second data storage 616 may be any type of physical memory and/or storage device (or portion thereof) that is described herein, and/or as would be understood by a person of skill in the relevant art(s) having the benefit of this disclosure.

Enforcer 620 is configured to receive a classification 622 for Web tracker 608. Classification 622 is an example of classification 222, as described above with reference to FIG. 2. However, it is noted to Web tracker mitigator 604 may be configured to receive classifications based on Web tracker classification techniques other than those described above in Subsection A. Enforcer 620 is configured to perform a mitigation with respect to Web tracker 608. For example, enforcer 620 may restrict access by Web tracker 608 to storage device 618 maintained by a computing device on which browser application 602 executes. For instance, enforcer 620 may monitor storage requests (e.g., read and/or write requests) made by Web tracker 608 via browser application 602 and block such requests. This prevents Web tracker 608 from accessing cookies stored in storage device 618, from storing per-user identifiers in storage device 618 that are utilized to track users across the Internet, etc. In other example, enforcer 620 may monitor network requests, for example, causing browser application 602 to redirect to another Web site and block such requests.

Mitigation engine 610 is configured to relax storage access and/or network requests made by certain Web trackers based on certain criteria. In accordance with an embodiment, such criteria comprise the user's engagement level with respect to the Web site associated with the Web tracker. For example, site engagement engine 612 is configured to generate a user engagement score for each Web site engaged by the user using browser application 602. Site engagement engine 612 is configured to increase the engagement score for a particular Web site as the engagement by the user increases and is configured to decrease the engagement score for a particular Web site as the engagement by the user decreases. For instance, site engagement engine 612 may increment the user engagement score each time a user visits Web site 606 via browser application 602, each time a user provides user input (e.g., clicks, highlights, scrolls, etc.) with respect to Web site 606, each time a user spends a predetermined duration of time on Web site, or otherwise interacts with Web site 606 in a meaningful way. Site engagement engine 612 may decrement the user engagement score after a user does not visit Web site 606 after a predetermined duration of time (e.g., 5 days). For instance, the user engagement score may decay exponentially over time if the user does not visit Web site 606 after a predetermined duration of time. Site engagement engine 612 stores the user engagement score for each Web site for which a score was generated in data storage 616. Data storage 616 maintains a mapping between user engagement scores and the Web site for which the scores were generated. For instance, data storage 616 may comprise a data structure, such as a table, that associates each Web site with its user engagement score.

When a user accesses Web site 606 via browser application 602, enforcer 620 queries mitigation engine 610 to determine the type of mitigation to be performed. In response, mitigation engine 610 queries data storage 616 for the user engagement score associated with Web site 606. Mitigation engine 610 compares the user engagement score to a predetermined threshold. If the user engagement score exceeds a predetermined threshold, then mitigation engine 610 determines that the user frequently interacts with Web site 606 and provides a notification to enforcer 620 indicating that the restrictions for Web tracker 608 may be relaxed. For instance, responsive to receiving such a notification, enforcer 620 may unrestrict storage access and/or network requests made by Web tracker 608. If the user engagement score does not exceed the predetermined threshold, then mitigation engine 610 determines that the user infrequently interacts with Web site 608 and provides a notification to enforcer 620 indicating that the restrictions for Web tracker 608 are to be maintained.

In accordance with an embodiment, web tracker mitigator 604 may unrestrict storage access for Web trackers associated with a particular organization (e.g., company or domain) to which the Web site belongs. For instance, if a user engagement score for a particular Web site associated a particular organization exceeds a predetermined threshold, then Web trackers associated with that organization are unrestricted across all Web sites associated with that particular organization.

For instance, data storage 614 may store a mapping that associates URLs for a plurality of Web sites to their respective organizations. For instance, data storage 614 may comprise a data structure, such as a table, that associates a particular organization with its respective URLs associated therewith. Data storage 616 may further associate a user engagement score determined for a particular Web site to the organization associated with that Web site. When a user accesses a Web site, enforcer 620 queries mitigation engine 610 to determine whether its Web tracker should be restricted or unrestricted. Enforcer 620 may provide the URL of the Web site to mitigation engine 610. Mitigation engine 610 queries data storage 614 to determine an organization associated with the Web site. Mitigation engine 610 queries data storage 616 to determine the user engagement score associated with the determined organization.

Mitigation engine 610 compares the user engagement score to a predetermined threshold. If the user engagement score exceeds a predetermined threshold, then mitigation engine 610 determines that the user frequently interacts with a Web site associated with the organization and provides a notification to enforcer 620 indicating that the restrictions for Web tracker 608 may be relaxed. For instance, responsive to receiving such a notification, enforcer 620 may unrestrict storage access and/or network requests made by Web tracker 608. If the user engagement score does not exceed the predetermined threshold, then mitigation engine 610 determines that the user infrequently interacts with Web sites associated with the organization and provides a notification to enforcer 620 indicating that the restrictions for the Web tracker are to be maintained.

Figure 7:
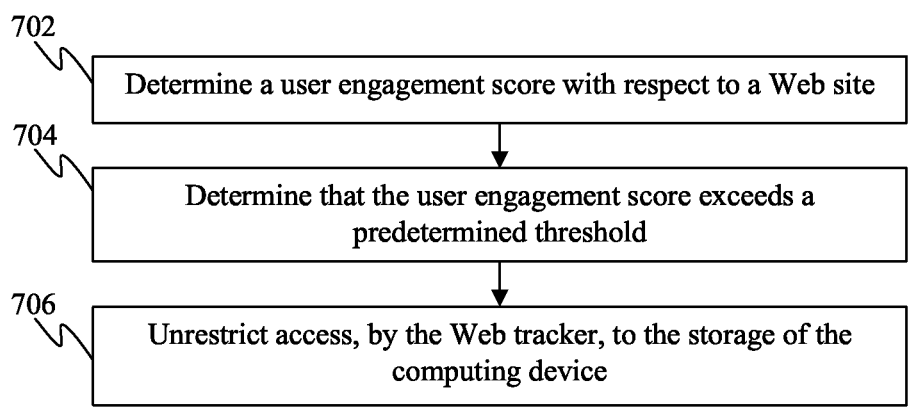
FIG. 7 shows a flowchart of a method for mitigating the effects of a Web tracker in accordance with example embodiment.

Accordingly, the effects of a Web tracker may be mitigated in many ways. For example, FIG. 7 shows a flowchart 700 of a method for mitigating the effects of a Web tracker in accordance with example embodiment. In an embodiment, flowchart 700 may be implemented by system 600, as described in FIG. 6. In particular, flowchart 700 may be implemented by Web tracker mitigator 604. Accordingly, flowchart 700 will be described with continued reference FIG. 6. Other structural and operational embodiments will be apparent to persons skilled in the relevant art(s) based on the following discussion regarding flowchart 700 and system 600.

Flowchart 700 of FIG. 7 begins with step 702. In step 702, a user engagement score with respect to a Web site is determined. For example, with reference to FIG. 6, site engagement engine 612 determines a user engagement score with respect to Web site 606 and stores the score in data storage 616.

In accordance with one or more embodiments, the user engagement score is based at least on one or more of a number of times the Web site was visited by the user using the browser application, a time spent on the Web site by the user using the browser application, a number of times a user provided user input via the Web site using the browser application, or a duration of time since the user visited the Web site using the browser application. For example, with reference to FIG. 6, the user engagement score determined for Web site 606 by site engagement engine 612 is based on at least one of one or more of a number of times Web site 606 was visited by the user using browser application 602, a time spent on Web site 606 by the user using the browser application 602, a number of times a user provided user input via Web site 606 using browser application 602, or a duration of time since the user visited Web site 606 using browser application 602.

At step 704, a determination is made that the user engagement score exceeds a predetermined threshold. For example, with reference to FIG. 6, mitigation engine 610 queries data storage 616 for the user engagement score associated with Web site 606, compares the user engagement score to a predetermined threshold, and determines that the user engagement score exceeds the predetermined threshold. In response, mitigation engine 610 provides a notification to enforcer 620 indicating that the restrictions for Web tracker 608 are to be relaxed.

At step 706, access by the Web tracker to the storage of the computing device is unrestricted. For example, with reference to FIG. 6, enforcer 620 unrestricts access, by Web tracker 608, to storage device 618 of the computing device on which browser application 602 executes.

In accordance with one or more embodiments, a determination is made that a second Web site accessed by the browser application is associated with the same organization as the first Web site. Responsive to the determination, access to storage of the computing device is unrestricted for a Web tracker of the second Web site. For example, with reference to FIG. 6, when accessing another Web site (not shown) via browser application 602, enforcer 620 queries mitigation engine 610 to determine whether a Web tracker associated with that Web site is to be restricted or unrestricted. Enforcer 620 may provide the URL of the Web site to mitigation engine 610. Mitigation engine 610 queries data storage 614 to determine an organization associated with the Web site. Data storage 616 may associate a user engagement score determined for a particular Web site to the organization associated with that Web site. Mitigation engine 610 queries data storage 616 to determine the user engagement score associated with the determined organization.

Mitigation engine 610 compares the user engagement score to a predetermined threshold. If the user engagement score exceeds a predetermined threshold, then mitigation engine 610 determines that the user frequently interacts with a Web site associated with the organization and provides a notification to enforcer 620 indicating that the restrictions for Web tracker 608 may be relaxed. For instance, responsive to receiving such a notification, enforcer 620 may unrestrict storage access and/or network requests made by the Web tracker. If the user engagement score does not exceed the predetermined threshold, then mitigation engine 610 determines that the user infrequently interacts with Web sites associated with the organization and provides a notification to enforcer 620 indicating that the restrictions for the Web tracker are to be maintained.

III. Example Mobile and Stationary Device Embodiments

The systems and methods described above, including the Web tracker classification and mitigation techniques in reference to FIGS. 1-7, Web tracker classifier 102, Web tracker mitigator 104, Web tracker classifier 202, browser application 220, machine learning model 206, Web tracker mitigator 204, metric determiner 212 data storage 216, obfuscator 214, noise generator 218, model trainer 502, machine learning algorithm 504, machine learning model 506, browser application 602, storage device 618, Web tracker mitigator 604, enforcer 620, mitigation engine 610, site engagement engine 612, data storage 614, and data storage 616, and/or each of the components described therein, and flowcharts 300, 400, and 700 may be implemented in hardware, or hardware combined with one or both of software and/or firmware. For example, Web tracker classifier 102, Web tracker mitigator 104, Web tracker classifier 202, browser application 220, machine learning model 206, Web tracker mitigator 204, metric determiner 212 data storage 216, obfuscator 214, noise generator 218, model trainer 502, machine learning algorithm 504, machine learning model 506, browser application 602, storage device 618, Web tracker mitigator 604, enforcer 620, mitigation engine 610, site engagement engine 612, data storage 614, and data storage 616, and/or each of the components described therein, and flowcharts 300, 400, and 700 may be each implemented as computer program code/instructions configured to be executed in one or more processors and stored in a computer readable storage medium. Alternatively, Web tracker classifier 102, Web tracker mitigator 104, Web tracker classifier 202, browser application 220, machine learning model 206, Web tracker mitigator 204, metric determiner 212 data storage 216, obfuscator 214, noise generator 218, model trainer 502, machine learning algorithm 504, machine learning model 506, browser application 602, storage device 618, Web tracker mitigator 604, enforcer 620, mitigation engine 610, site engagement engine 612, data storage 614, and data storage 616, and/or each of the components described therein, and flowcharts 300, 400, and 700 may be implemented in one or more SoCs (system on chip). An SoC may include an integrated circuit chip that includes one or more of a processor (e.g., a central processing unit (CPU), microcontroller, microprocessor, digital signal processor (DSP), etc.), memory, one or more communication interfaces, and/or further circuits, and may optionally execute received program code and/or include embedded firmware to perform functions.

Figure 8:
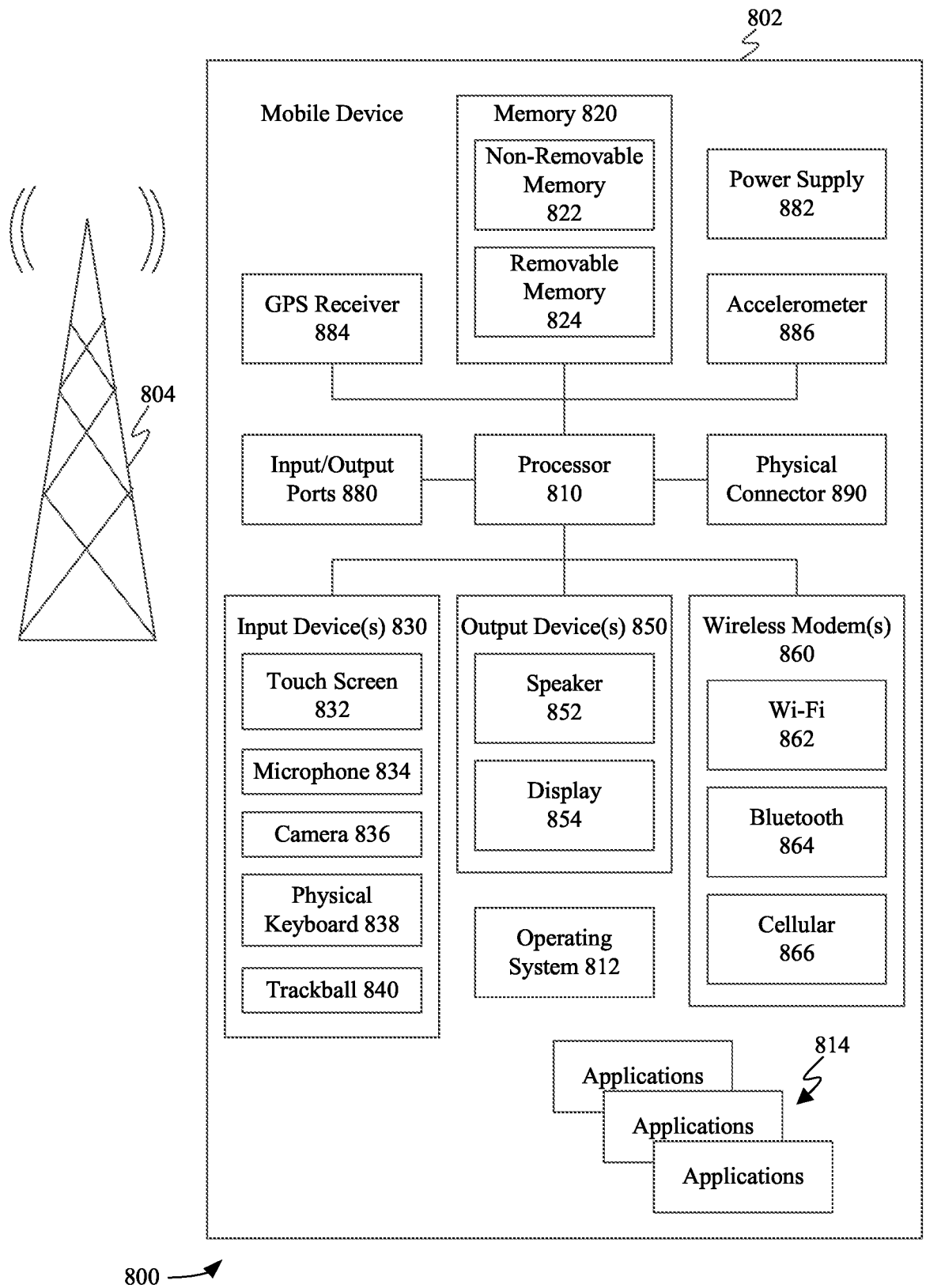
FIG. 8 is a block diagram of an exemplary user device in which embodiments may be implemented.

FIG. 8 shows a block diagram of an exemplary mobile device 800 including a variety of optional hardware and software components, shown generally as components 802. Any number and combination of the features/elements of Web tracker classifier 102, Web tracker mitigator 104, Web tracker classifier 202, browser application 220, machine learning model 206, Web tracker mitigator 204, metric determiner 212 data storage 216, obfuscator 214, noise generator 218, model trainer 502, machine learning algorithm 504, machine learning model 506, browser application 602, storage device 618, Web tracker mitigator 604, enforcer 620, mitigation engine 610, site engagement engine 612, data storage 614, and data storage 616, and/or each of the components described therein, and flowcharts 300, 400, and 700 may be implemented as components 802 included in a mobile device embodiment, as well as additional and/or alternative features/elements, as would be known to persons skilled in the relevant art(s). It is noted that any of components 802 can communicate with any other of components 802, although not all connections are shown, for ease of illustration. Mobile device 800 can be any of a variety of mobile devices described or mentioned elsewhere herein or otherwise known (e.g., cell phone, smartphone, handheld computer, Personal Digital Assistant (PDA), etc.) and can allow wireless two-way communications with one or more mobile devices over one or more communications networks 804, such as a cellular or satellite network, or with a local area or wide area network.

The illustrated mobile device 800 can include a controller or processor referred to as processor circuit 810 for performing such tasks as signal coding, image processing, data processing, input/output processing, power control, and/or other functions. Processor circuit 810 is an electrical and/or optical circuit implemented in one or more physical hardware electrical circuit device elements and/or integrated circuit devices (semiconductor material chips or dies) as a central processing unit (CPU), a microcontroller, a microprocessor, and/or other physical hardware processor circuit. Processor circuit 810 may execute program code stored in a computer readable medium, such as program code of one or more applications 814, operating system 812, any program code stored in memory 820, etc. Operating system 812 can control the allocation and usage of the components 802 and support for one or more application programs 814 (a.k.a. applications, "apps", etc.). Application programs 814 can include common mobile computing applications (e.g., email applications, calendars, contact managers, web browsers, messaging applications) and any other computing applications (e.g., word processing applications, mapping applications, media player applications).

As illustrated, mobile device 800 can include memory 820. Memory 820 can include non-removable memory 822 and/or removable memory 824. The non-removable memory 822 can include RAM, ROM, flash memory, a hard disk, or other well-known memory storage technologies. The removable memory 824 can include flash memory or a Subscriber Identity Module (SIM) card, which is well known in GSM communication systems, or other well-known memory storage technologies, such as "smart cards." The memory 820 can be used for storing data and/or code for running operating system 812 and applications 814. Example data can include web pages, text, images, sound files, video data, or other data sets to be sent to and/or received from one or more network servers or other devices via one or more wired or wireless networks. Memory 820 can be used to store a subscriber identifier, such as an International Mobile Subscriber Identity (IMSI), and an equipment identifier, such as an International Mobile Equipment Identifier (IMEI). Such identifiers can be transmitted to a network server to identify users and equipment.

A number of programs may be stored in memory 820. These programs include operating system 812, one or more application programs 814, and other program modules and program data. Examples of such application programs or program modules may include, for example, computer program logic (e.g., computer program code or instructions) for implementing the systems and methods described above, including the embodiments described in reference to FIGS. 1-7.

Mobile device 800 can support one or more input devices 830, such as a touch screen 832, microphone 834, camera 836, physical keyboard 838 and/or trackball 840 and one or more output devices 850, such as a speaker 852 and a display 854.

Other possible output devices (not shown) can include piezoelectric or other haptic output devices. Some devices can serve more than one input/output function. For example, touch screen 832 and display 854 can be combined in a single input/output device. The input devices 830 can include a Natural User Interface (NUI).

Wireless modem(s) 860 can be coupled to antenna(s) (not shown) and can support two-way communications between processor circuit 810 and external devices, as is well understood in the art. The modem(s) 860 are shown generically and can include a cellular modem 866 for communicating with the mobile communication network 804 and/or other radio-based modems (e.g., Bluetooth 864 and/or Wi-Fi 862). Cellular modem 866 may be configured to enable phone calls (and optionally transmit data) according to any suitable communication standard or technology, such as GSM, 3G, 4G, 5G, etc. At least one of the wireless modem(s) 860 is typically configured for communication with one or more cellular networks, such as a GSM network for data and voice communications within a single cellular network, between cellular networks, or between the mobile device and a public switched telephone network (PSTN).

Mobile device 800 can further include at least one input/output port 880, a power supply 882, a satellite navigation system receiver 884, such as a Global Positioning System (GPS) receiver, an accelerometer 886, and/or a physical connector 890, which can be a USB port, IEEE 1394 (FireWire) port, and/or RS-232 port. The illustrated components 802 are not required or all-inclusive, as any components can be not present and other components can be additionally present as would be recognized by one skilled in the art.

Figure 9:
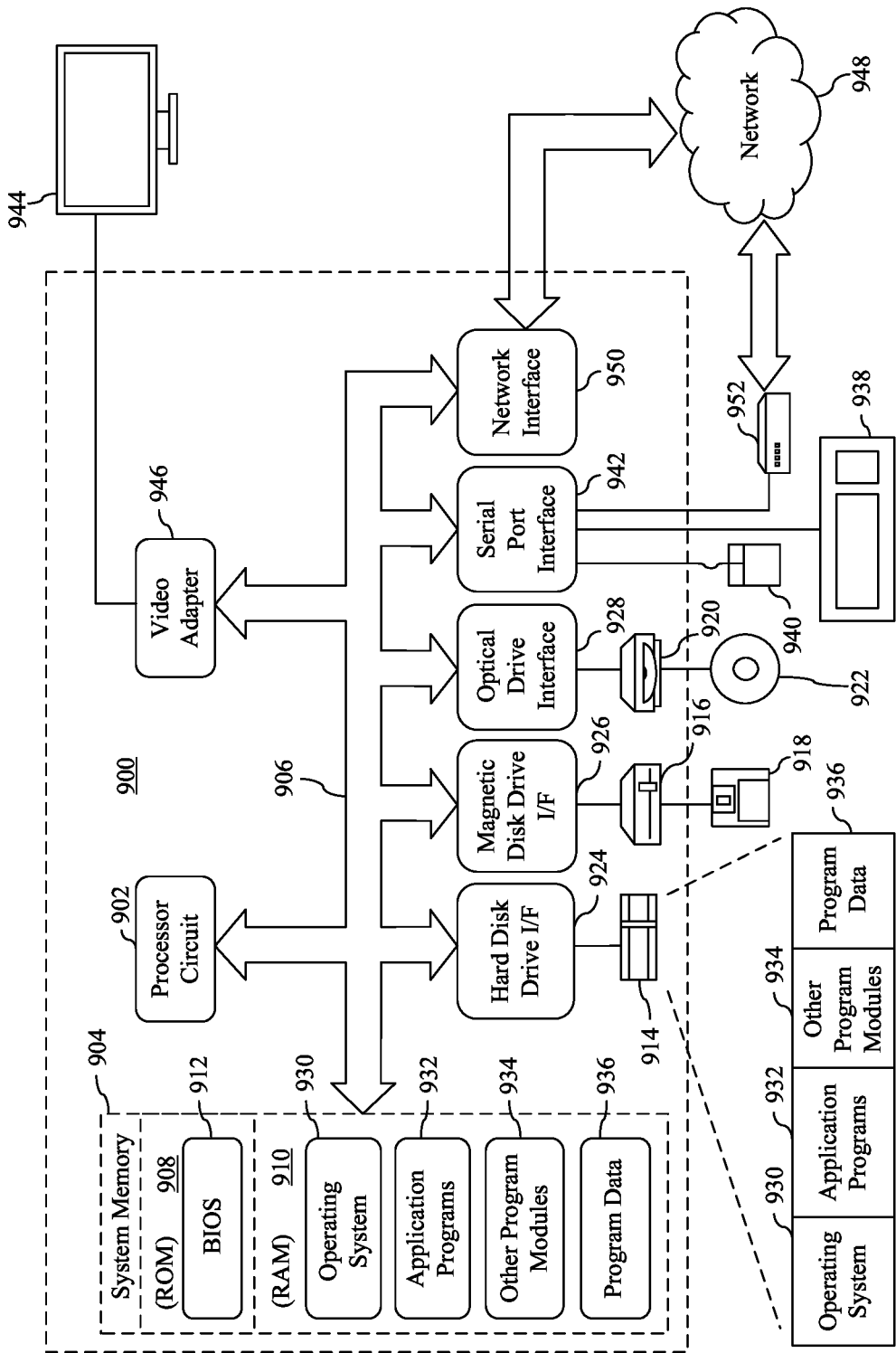
FIG. 9 is a block diagram of an example processor-based computer system that may be used to implement various embodiments.

Furthermore, FIG. 9 depicts an exemplary implementation of a computing device 700 in which embodiments may be implemented, including Web tracker classifier 102, Web tracker mitigator 104, Web tracker classifier 202, browser application 220, machine learning model 206, Web tracker mitigator 204, metric determiner 212 data storage 216, obfuscator 214, noise generator 218, model trainer 502, machine learning algorithm 504, machine learning model 506, browser application 602, storage device 618, Web tracker mitigator 604, enforcer 620, mitigation engine 610, site engagement engine 612, data storage 614, and data storage 616, and/or each of the components described therein, and flowcharts 300, 400, and 700. The description of computing device 700 provided herein is provided for purposes of illustration, and is not intended to be limiting. Embodiments may be implemented in further types of computer systems, as would be known to persons skilled in the relevant art(s).

As shown in FIG. 9, computing device 900 includes one or more processors, referred to as processor circuit 902, a system memory 904, and a bus 906 that couples various system components including system memory 904 to processor circuit 902. Processor circuit 902 is an electrical and/or optical circuit implemented in one or more physical hardware electrical circuit device elements and/or integrated circuit devices (semiconductor material chips or dies) as a central processing unit (CPU), a microcontroller, a microprocessor, and/or other physical hardware processor circuit. Processor circuit 902 may execute program code stored in a computer readable medium, such as program code of operating system 930, application programs 932, other programs 934, etc. Bus 906 represents one or more of any of several types of bus structures, including a memory bus or memory controller, a peripheral bus, an accelerated graphics port, and a processor or local bus using any of a variety of bus architectures. System memory 904 includes read only memory (ROM) 908 and random access memory (RAM) 910. A basic input/output system 912 (BIOS) is stored in ROM 908.

Computing device 900 also has one or more of the following drives: a hard disk drive 914 for reading from and writing to a hard disk, a magnetic disk drive 916 for reading from or writing to a removable magnetic disk 918, and an optical disk drive 920 for reading from or writing to a removable optical disk 922 such as a CD ROM, DVD ROM, or other optical media. Hard disk drive 914, magnetic disk drive 916, and optical disk drive 920 are connected to bus 906 by a hard disk drive interface 924, a magnetic disk drive interface 926, and an optical drive interface 928, respectively. The drives and their associated computer-readable media provide nonvolatile storage of computer-readable instructions, data structures, program modules and other data for the computer. Although a hard disk, a removable magnetic disk and a removable optical disk are described, other types of hardware-based computer-readable storage media can be used to store data, such as flash memory cards, digital video disks, RAMs, ROMs, and other hardware storage media.

A number of program modules may be stored on the hard disk, magnetic disk, optical disk, ROM, or RAM. These programs include operating system 930, one or more application programs 932, other programs 934, and program data 936. Application programs 932 or other programs 934 may include, for example, computer program logic (e.g., computer program code or instructions) for implementing the systems and methods described above, including the embodiments described above with reference to FIGS. 1-7.

A user may enter commands and information into the computing device 900 through input devices such as keyboard 938 and pointing device 940. Other input devices (not shown) may include a microphone, joystick, game pad, satellite dish, scanner, a touch screen and/or touch pad, a voice recognition system to receive voice input, a gesture recognition system to receive gesture input, or the like. These and other input devices are often connected to processor circuit 902 through a serial port interface 942 that is coupled to bus 906, but may be connected by other interfaces, such as a parallel port, game port, or a universal serial bus (USB).

A display screen 944 is also connected to bus 906 via an interface, such as a video adapter 946. Display screen 944 may be external to, or incorporated in computing device 900. Display screen 944 may display information, as well as being a user interface for receiving user commands and/or other information (e.g., by touch, finger gestures, virtual keyboard, etc.). In addition to display screen 944, computing device 900 may include other peripheral output devices (not shown) such as speakers and printers.

Computing device 900 is connected to a network 948 (e.g., the Internet) through an adaptor or network interface 950, a modem 952, or other means for establishing communications over the network. Modem 952, which may be internal or external, may be connected to bus 906 via serial port interface 942, as shown in FIG. 9, or may be connected to bus 906 using another interface type, including a parallel interface.

As used herein, the terms "computer program medium," "computer-readable medium," and "computer-readable storage medium" are used to generally refer to physical hardware media such as the hard disk associated with hard disk drive 914, removable magnetic disk 918, removable optical disk 922, other physical hardware media such as RAMs, ROMs, flash memory cards, digital video disks, zip disks, MEMs, nanotechnology-based storage devices, and further types of physical/tangible hardware storage media (including system memory 904 of FIG. 9). Such computer-readable storage media are distinguished from and non-overlapping with communication media (do not include communication media). Communication media typically embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media, as well as wired media. Embodiments are also directed to such communication media.

As noted above, computer programs and modules (including application programs 932 and other programs 934) may be stored on the hard disk, magnetic disk, optical disk, ROM, RAM, or other hardware storage medium. Such computer programs may also be received via network interface 950, serial port interface 952, or any other interface type. Such computer programs, when executed or loaded by an application, enable computing device 900 to implement features of embodiments discussed herein. Accordingly, such computer programs represent controllers of the computing device 900.

Embodiments are also directed to computer program products comprising computer code or instructions stored on any computer-readable medium. Such computer program products include hard disk drives, optical disk drives, memory device packages, portable memory sticks, memory cards, and other types of physical storage hardware.

IV. Further Example Embodiments

A method for classifying and mitigating the effects of a Web tracker is described herein. The method comprises: determining tracker-related metrics associated with a Web site accessed by a browser application; obfuscating the tracker-related metrics based at least on a browser history of the user; providing the obfuscated metrics as an input to a machine learning model, the machine learning model outputting a classification of a Web tracker associated with the Web site based on the obfuscated metrics; and determining a mitigation to be performed with respect to the Web tracker based at least on the classification.

In one embodiment of the foregoing method, the tracker-related metrics comprise at least one of: a type of one or more resources loaded for the Web site; a frequency at which the one or more resources are loaded for the Web site; or one or more uniform resource locaters to which the browser application is redirected.

In one embodiment of the foregoing method, obfuscating the tracker-related metrics further comprises: obfuscating the tracker-related metrics based on the browser history of the user and randomly-generated noise.

In one embodiment of the foregoing method, the mitigation comprises: restricting access, by the Web tracker, to storage of a computing device on which the browser application executes.

In one embodiment of the foregoing method, the method further comprises: determining a user engagement score with respect to the Web site; determining that the user engagement score exceeds a predetermined threshold; and responsive to determining that the user engagement score exceeds the predetermined threshold, unrestricting access, by the Web tracker, to the storage of the computing device.

In one embodiment of the foregoing method, the user engagement score is based at least on one or more of: a number of times the Web site was visited by the user using the browser application; a time spent on the Web site by the user using the browser application; a number of times a user provided user input via the Web site using the browser application; or a duration of time since the user visited the Web site using the browser application.

In one embodiment of the foregoing method, the method further comprises: determining that a second Web site accessed by the browser application is associated with the same organization as the first Web site; and unrestricting access, by a Web tracker of the second Web site, to the storage of the computing device.

In one embodiment of the foregoing method, the machine learning model is generated by:

for each second Web site of a plurality of second Web sites: providing tracker-related metrics associated with the second Web site as training data to a machine learning algorithm, the tracker-related metrics associated with each Web site being obfuscated based on the plurality of second Web sites; and providing a label from a plurality of labels specifying a Web tracker from a plurality of Web trackers corresponding to the tracker-related metrics associated with the second Web site, the machine learning algorithm generating the machine learning model based on the tracker-related metrics for each of the plurality of second Web sites and the plurality of labels.

A system is also described herein. The system includes at least one processor circuit; and at least one memory that stores program code configured to be executed by the at least one processor circuit, the program code comprising: a tracker classifier configured to: determine tracker-related metrics associated with a Web site accessed by a browser application; obfuscate the tracker-related metrics based at least on a browser history of the user; and provide the obfuscated metrics as an input to a machine learning model, the machine learning model outputting a classification of a Web tracker associated with the Web site based on the obfuscated metrics; and a tracker mitigator configured to determine a mitigation to be performed with respect to the Web tracker based at least on the classification.

In one embodiment of the foregoing system, the tracker-related metrics comprise at least one of: a type of one or more resources loaded for the Web site; a frequency at which the one or more resources are loaded for the Web site; or one or more uniform resource locaters to which the browser application is redirected.

In one embodiment of the foregoing system, the tracker classifier is further configured to obfuscate the tracker-related metrics based on the browser history of the user and randomly-generated noise.

In one embodiment of the foregoing system, the tracker mitigator is further configured to mitigate an effect of the Web tracker by restricting access, by the Web tracker, to storage of a computing device on which the browser application executes.

In one embodiment of the foregoing system, the application layer authentication information is included in a hypertext transfer protocol (HTTP) connect header of the request message.

In one embodiment of the foregoing system, the tracker mitigator is further configured to: determine a user engagement score with respect to the Web site; determine that the user engagement score exceeds a predetermined threshold; and responsive to determining that the user engagement score exceeds the predetermined threshold, unrestrict access, by the Web tracker, to the storage of the computing device.

In one embodiment of the foregoing system, the user engagement score is based at least on one or more of: a number of times the Web site was visited by the user using the browser application; a time spent on the Web site by the user using the browser application; a number of times a user provided user input via the Web site using the browser application; or a duration of time since the user visited the Web site using the browser application.

In one embodiment of the foregoing system, the tracker mitigator is further configured to: determine that a second Web site accessed by the browser application is associated with the same organization as the first Web site; and unrestrict access, by a Web tracker of the second Web site, to the storage of the computing device.

A computer-readable storage medium having program instructions recorded thereon that, when executed by at least one processor of a computing device, perform a method for classifying and mitigating the effects of a Web tracker. The method comprises: determining tracker-related metrics associated with a Web site accessed by a browser application; obfuscating the tracker-related metrics based at least on a browser history of the user; providing the obfuscated metrics as an input to a machine learning model, the machine learning model outputting a classification of a Web tracker associated with the Web site based on the obfuscated metrics; and determining a mitigation to be performed with respect to the Web tracker based at least on the classification.

In one embodiment of the foregoing computer-readable storage medium, the tracker-related metrics comprise at least one of: a type of one or more resources loaded for the Web site; a frequency at which the one or more resources are loaded for the Web site; or one or more uniform resource locaters to which the browser application is redirected.

In one embodiment of the foregoing computer-readable storage medium, obfuscating the tracker-related metrics comprises: obfuscating the tracker-related metrics based on the browser history of the user and randomly generated noise.

In one embodiment of the foregoing computer-readable storage medium, the mitigation comprises: restricting access, by the Web tracker, to storage of the computing device on which the browser application executes.

In one embodiment of the foregoing computer-readable storage medium, the method further comprises: determining a user engagement score with respect to the Web site; determining that the user engagement score exceeds a predetermined threshold; and responsive to determining that the user engagement score exceeds the predetermined threshold, unrestricting access, by the Web tracker, to the storage of the computing device.

V. Conclusion

While various embodiments have been described above, it should be understood that they have been presented by way of example only, and not limitation. It will be understood by those skilled in the relevant art(s) that various changes in form and details may be made therein without departing from the spirit and scope of the described embodiments as defined in the appended claims. Accordingly, the breadth and scope of the present embodiments should not be limited by any of the above-described exemplary embodiments, but should be defined only in accordance with the following claims and their equivalents.

What is claimed is:

1. A computer-implemented method for classifying and mitigating effects of a Web tracker, comprising:
   determining tracker-related metrics associated with a Web site accessed by a browser application;
   obfuscating the tracker-related metrics based at least on a browser history of a user;
   based on the obfuscated metrics, generating a classification of the Web tracker associated with the Web site based on the obfuscated metrics;
   determining a mitigation to be performed with respect to the Web tracker based at least on the classification; and
   performing the determined mitigation.

2. The method of claim 1, wherein the tracker-related metrics comprise at least one of:
   a type of one or more resources loaded for the Web site;
   a frequency at which the one or more resources are loaded for the Web site; or
   one or more uniform resource locaters to which the browser application is redirected.

3. The method of claim 1, wherein obfuscating the tracker-related metrics further comprises:
   obfuscating the tracker-related metrics based on the browser history of the user and randomly generated noise.

4. The method of claim 1, wherein the mitigation comprises:
   restricting access, by the Web tracker, to storage of a computing device on which the browser application executes.

5. The method of claim 4, further comprising:
   determining a user engagement score with respect to the Web site;
   determining that the user engagement score exceeds a predetermined threshold; and
   responsive to determining that the user engagement score exceeds the predetermined threshold, unrestricting access, by the Web tracker, to the storage of the computing device.

6. The method of claim 5, wherein the user engagement score is based at least on one or more of:
   a number of times the Web site was visited by the user using the browser application;

a time spent on the Web site by the user using the browser application;
a number of times a user provided user input via the Web site using the browser application; or
a duration of time since the user visited the Web site using the browser application.

7. The method of claim 5, wherein the Web site is a first Web site and the method further comprises:
determining that a second Web site accessed by the browser application is associated with a same organization as the first Web site; and
unrestricting access, by a Web tracker of the second Web site, to the storage of the computing device.

8. The method of claim 1, wherein generating a classification of the Web tracker includes providing the obfuscated metrics as an input to a machine learning model, the machine learning model outputting a classification of a Web tracker associated with the Web site based on the obfuscated metrics.

9. The method of claim 8, wherein the machine learning model is generated by:
for each second Web site of a plurality of second Web sites:
providing tracker-related metrics associated with the second Web site as training data to a machine learning algorithm, the tracker-related metrics associated with second Web site being obfuscated based on the plurality of second Web sites; and
providing a label from a plurality of labels specifying a Web tracker from a plurality of Web trackers corresponding to the tracker-related metrics associated with the second Web site, the machine learning algorithm generating the machine learning model based on the tracker-related metrics for each of the plurality of second Web sites and the plurality of labels.

10. A computing device, comprising:
at least one processor circuit; and
at least one memory that stores program code configured to be executed by the at least one processor circuit to cause the computing device to perform operations comprising:
executing a browser application;
determining tracker-related metrics associated with a Web site accessed by the browser application;
obfuscating the tracker-related metrics based at least on a browser history of a user;
based on the obfuscated metrics, generating a classification of a Web tracker associated with the Web site based on the obfuscated metrics;
determining a mitigation to be performed with respect to the Web tracker based at least on the classification; and
performing the determined mitigation.

11. The computing device of claim 10, wherein generating a classification of the Web tracker includes providing the obfuscated metrics as an input to a machine learning model, the machine learning model outputting a classification of a Web tracker associated with the Web site based on the obfuscated metrics.

12. The computing device of claim 11, wherein the machine learning model is generated by:
for each second Web site of a plurality of second Web sites:
providing tracker-related metrics associated with the second Web site as training data to a machine learning algorithm, the tracker-related metrics associated with second Web site being obfuscated based on the plurality of second Web sites; and
providing a label from a plurality of labels specifying a Web tracker from a plurality of Web trackers corresponding to the tracker-related metrics associated with the second Web site, the machine learning algorithm generating the machine learning model based on the tracker-related metrics for each of the plurality of second Web sites and the plurality of labels.

13. The computing device of claim 10, wherein the mitigation comprises restricting access, by the Web tracker, to storage of the computing device.

14. The computing device of claim 13, wherein the operations further comprise:
determining a user engagement score with respect to the Web site;
determining that the user engagement score exceeds a predetermined threshold; and
responsive to determining that the user engagement score exceeds the predetermined threshold, unrestricting access, by the Web tracker, to the storage of the computing device.

15. The computing device of claim 14, wherein the user engagement score is based at least on one or more of:
a number of times the Web site was visited by the user using the browser application;
a time spent on the Web site by the user using the browser application;
a number of times a user provided user input via the Web site using the browser application; or
a duration of time since the user visited the Web site using the browser application.

16. A computer-implemented method for classifying and mitigating effects of a Web tracker, comprising:
determining tracker-related metrics associated with a Web site accessed by a browser application;
obfuscating the tracker-related metrics based at least on a browser history of a user;
based on the obfuscated metrics, generating a classification of the Web tracker associated with the Web site based on the obfuscated metrics; and
based at least on the classification, restricting access, by the Web tracker, to storage of a computing device on which the browser application executes.

17. The method of claim 16, further comprising:
determining a user engagement score with respect to the Web site;
determining that the user engagement score exceeds a predetermined threshold; and
responsive to determining that the user engagement score exceeds the predetermined threshold, unrestricting access, by the Web tracker, to the storage of the computing device.

18. The method of claim 17, wherein the user engagement score is based at least on one or more of:
a number of times the Web site was visited by the user using the browser application;
a time spent on the Web site by the user using the browser application;
a number of times a user provided user input via the Web site using the browser application; or
a duration of time since the user visited the Web site using the browser application.

19. The method of claim 17, wherein the Web site is a first Web site and the method further comprises:

determining that a second Web site accessed by the browser application is associated with a same organization as the first Web site; and unrestricting access, by a Web tracker of the second Web site, to the storage of the computing device.

20. The method of claim 16, wherein the tracker-related metrics comprise at least one of:

a type of one or more resources loaded for the Web site;

a frequency at which the one or more resources are loaded for the Web site; or one or more uniform resource locaters to which the browser application is redirected.

\* \* \* \* \*